United States Patent [19]

Aiba

[11] 4,364,055

[45] Dec. 14, 1982

[54] INK ISSUANCE DIRECTION CHECK SYSTEM IN AN INK JET SYSTEM PRINTER

[75] Inventor: Masahiko Aiba, Nara, Japan

[73] Assignee: Sharp Kabushiki Kaisha, Osaka, Japan

[21] Appl. No.: 276,971

[22] Filed: Jun. 24, 1981

[30] Foreign Application Priority Data

Jun. 30, 1980 [JP] Japan .................................. 55-89773

[51] Int. Cl.$^3$ .............................................. G01D 15/18

[52] U.S. Cl. ........................................ 346/1.1; 346/75; 346/140 R

[58] Field of Search ............................ 346/1.1, 75, 140

[56] References Cited

U.S. PATENT DOCUMENTS 3,911,445 10/1975 Foster .................................. 346/1.1

4,207,582 6/1980 Yamamoto ..................... 346/140 IJ

*Primary Examiner*—Donald A. Griffin

*Attorney, Agent, or Firm*—Birch, Stewart, Kolasch & Birch

[57] ABSTRACT

An ink jet system printer of the charge amplitude controlling type includes a beam gutter for collecting ink droplets not contributing to the actual printing operation. An ink returning system is provided for returning the collected ink liquid to an ink liquid reservoir. An optical detection system is provided in the course of the ink returning system for detecting whether the ink liquid is properly collected by the beam gutter. When the ink liquid is not observed by the optical detection system for a period longer than a preselected period, a determination system develops a control signal for terminating the formation of the ink droplets.

13 Claims, 8 Drawing Figures

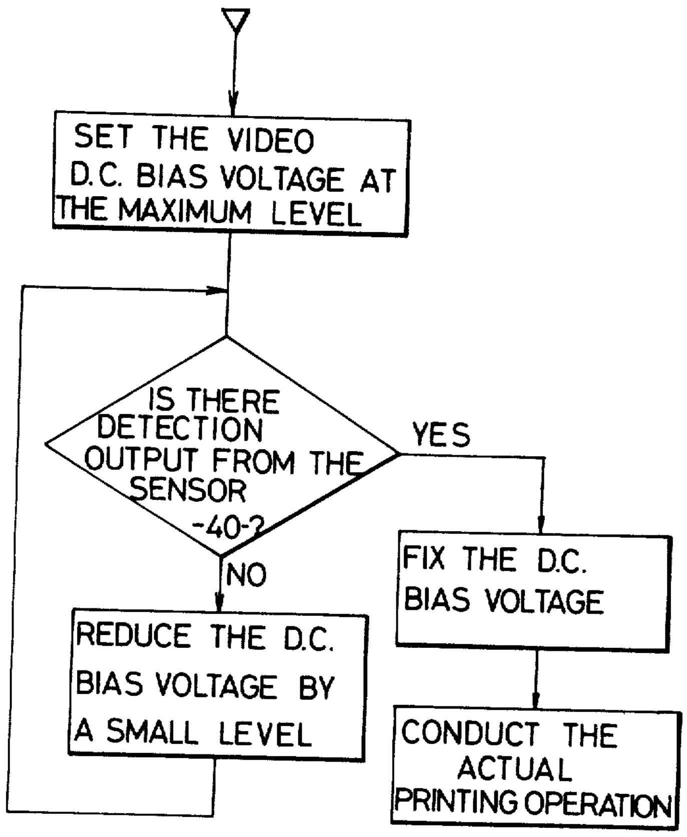
FIG. 8 (AUTOMATIC ADJUSTING)

INK ISSUANCE DIRECTION CHECK SYSTEM IN AN INK JET SYSTEM PRINTER

BACKGROUND AND SUMMARY OF THE INVENTION

The present invention relates to an ink jet system printer of the charge amplitude controlling type and, more particularly, to a check system for detecting an abnormal ink issuance direction in an ink jet system printer.

Generally, an ink jet system printer of the charge amplitude controlling type includes a carriage travelling in a lateral direction. An ink droplet issuance unit is mounted on the carriage. A deflection system is employed to deflect travelling ink droplets in a vertical direction, thereby printing a desired symbol in a dot matrix fashion. The deflection amount must be accurately controlled to ensure a clean printing. It will be clear that the direction of the ink droplets emitted from the ink droplet issuance unit must be accurately controlled to ensure the accurate deflection operation.

Accordingly, an object of the present invention is to provide a check system for detecting the direction of the ink droplets emitted from an ink droplet issuance unit in an ink jet system printer of the charge amplitude controlling type.

Another object of the present invention is to provide a detection system for detecting the direction of the ink droplets which do not contribute to the actual printing operation in an ink jet system printer of the charge amplitude controlling type.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a detection system is provided in the course of a recirculation path connected to a beam gutter for detecting whether ink liquid is properly collected by the beam gutter. If the ink liquid is not collected by the beam gutter for more than a preselected period of time, the detection system develops a control signal for indicating the abnormal issuance direction of the ink liquid emitted from the ink droplet issuance unit.

BRIEF DESCRIPTION OF THE DRAWINGS

The present invention will be better understood from the detailed description given hereinbelow and the accompanying drawings which are given by way of illustration only, and thus are not limitative of the present invention, and wherein:

FIG. 8 is a flow chart for explaining an automatic control of the ink issuance direction is another embodiment of the ink jet system printer of the charge amplitude controlling type of the present invention.

DESCRIPTION OF THE PREFERRED EMBODIMENTS

Figure 1:
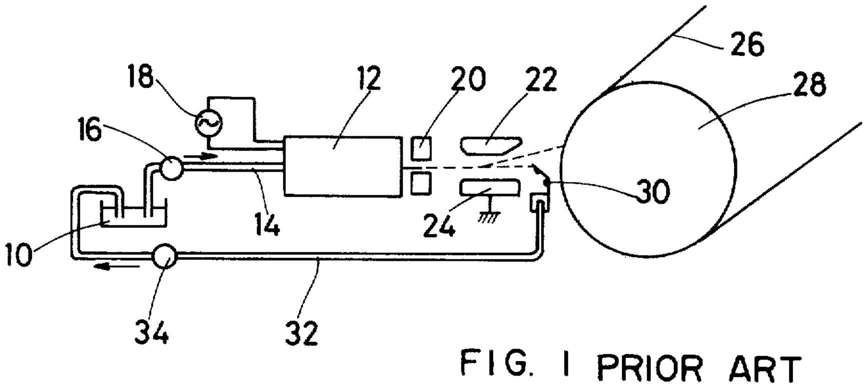
FIG. 1 PRIOR ART
FIG. 1 is a schematic sectional view of an ink jet system printer of the charge amplitude controlling type of the prior art.

An ink jet system printer of the charge amplitude controlling type generally includes an ink liquid reservoir 10 for containing ink liquid therein, an ink droplet issuance unit 12, an ink liquid supply conduit 14 and a supply pump 16 for supplying the ink liquid of a predetermined pressure to the ink droplet issuance unit 12 via the ink liquid supply conduit 14.

The ink droplet issuance unit 12 includes a nozzle for emitting ink droplets and an electromechanical transducer attached to the nozzle for vibrating the nozzle at a given frequency of an excitation signal which is developed from an oscillator 18. Thus, the nozzle emits the ink droplets at the given frequency. A charging tunnel 20 is disposed in front of the ink droplet issuance unit 12 for charging the ink droplets in accordance with the print information signal. The thus charged ink droplets are deflected while they pass through a high voltage constant electric field established by a pair of deflection electrodes 22 and 24. The deflected ink droplets are directed to a record receiving paper 26 supported by a platen 28. The deflection is conducted in the vertical direction. The above-mentioned ink droplet issuance unit 12, the charging tunnel 20 and the pair of deflection electrodes 22 and 24 are mounted on a carriage which is driven to reciprocate in the lateral direction, whereby desired symbols are printed on the record receiving paper 26 in the dot matrix fashion.

Ink droplets not contributing to the actual printing operation are neither charged nor deflected. The ink droplets not contributing to the actual printing operation are directed to a beam gutter 30. The ink liquid collected by the beam gutter 30 is returned to the ink liquid reservoir 10 via an ink liquid returning conduit 32 and a returning pump 34.

In a typical system, the nozzle included in the ink droplet issuance unit 12 has an orifice about 30 $\mu\phi$ through 50 $\mu\phi$. The initial velocity of the ink droplets emitted from the ink droplet issuance unit 12 is about 18 m/sec. A preferred excitation signal frequency is about 50 KHz through 100 KHz. Therefore, the ink droplets are provided at the given excitation frequency, 50 KHz through 100 KHz.

Figure 2:
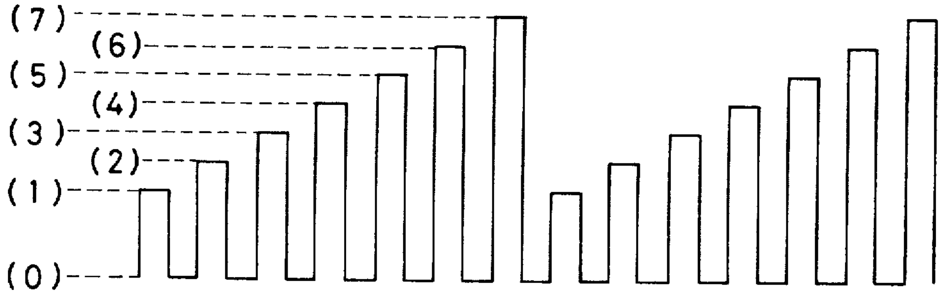
FIG. 2 is a waveform chart showing a charging signal applied to a charging tunnel included in the ink jet system printer of FIG. 1.

FIG. 2 shows an example of the charging signal applied to the charging tunnel 20. The charging signal of FIG. 2 is for printing two columns of solid lines in $5\times7$ matrix format with interpolation droplets which are provided between each adjacent two ink droplets contributing to the actual printing operation. More specifically, the ink droplets charged to the zero level (0), normally not charged, are directed to the beam gutter 30 for recirculation purposes. The ink droplets charged to the first dot level (1) are directed to the seventh dot position in one column in the $5\times7$ dot matrix format.

The ink droplets charged to the seventh dot level (7) are directed to the uppermost first dot position in one column in the 5×7 dot matrix format.

It will be clear from the foregoing description that the tip end of the beam gutter 30 should be located between the ink droplet position of the zero level (0) and the seventh dot position corresponding to the first dot level (1). If the direction of the emission of the ink droplets is deviated upward due to the unstability of the droplet formation condition, there is a possibility that the ink droplets charged to the zero level (0) will pass over the beam gutter 30 and reach the record receiving paper 26. This precludes the accurate printing and the stable operation of the ink jet system printer. Contrarily, when the direction of the ink droplet emission is deviated downward, there is a possibility that the ink droplets charged to the first dot level (1) will be caught by the beam gutter 30. This also precludes the accurate printing. The former condition is more serious in the ink jet system printer of the charge amplitude controlling type because the ink droplets not caught by the beam gutter 30 will damage the printer system.

Figure 3:
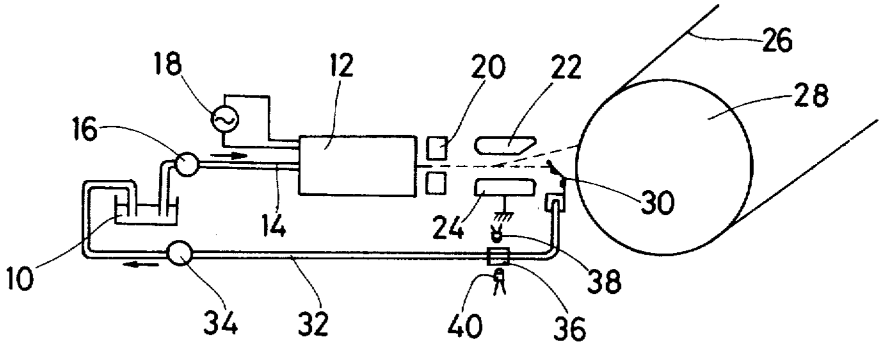
FIG. 3 is a schematic section view of an embodiment of an ink jet system printer of the charge amplitude controlling type of the present invention.

The present invention is to detect the condition where the ink droplets charged to the zero level (0) pass over the beam gutter 30. FIG. 3 shows an embodiment of an ink jet system printer of the charge amplitude controlling type of the present invention. Like elements corresponding to those of FIG. 1 are indicated by like numerals.

Figure 4:
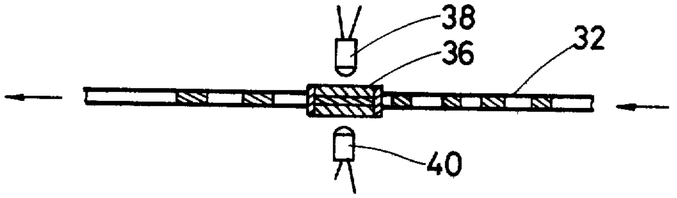
FIG. 4 is an enlarged sectional view of an ink liquid detection system included in the ink jet system printer of FIG. 3.

A temporary ink container 36 is disposed in the ink liquid returning conduit 32 near the beam gutter 30. The temporary ink container 36 is made of a transparent material. A light emitting element 38 and a light responsive element 40 are disposed in a fashion to sandwich the temporary ink container 36. FIG. 4 shows, in detail, the relationships between the temporary ink container 36 and the light emitting element 38 and the light responsive element 40.

Figure 5:
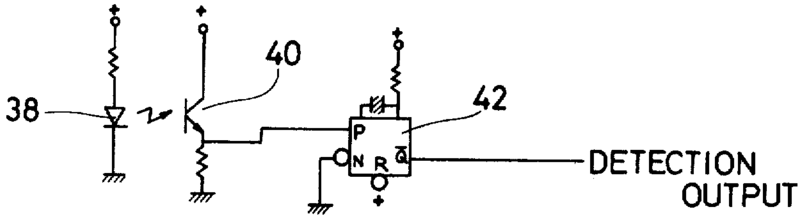
FIG. 5 is a schematic block diagram of a detection system of the present invention included in the ink jet system printer of FIG. 3.

The light responsive element 40 is connected to a detection system shown in FIG. 5. The detection system includes a retriggerable one-shot multivibrator 42 of which an input terminal is connected to the output terminal of the light responsive element 40. The retriggerable one-shot multivibrator 42 develops a detection output indicating an abnormal emission direction of the ink liquid.

The suction rate of the returning pump 34 is selected higher than the developing rate of the supply pump 16. As already discussed above, the interpolation droplets are disposed between the adjacent two ink droplets contributing to the actual printing operation. Accordingly, in the normal operation mode, the ink liquid and the air appear alternatively in the temporary ink container 36 as shown in FIG. 4. More specifically, in the normal operation mode, the light beam emitted from the light emitting element 38 is repeatedly shielded by the ink liquid appearing in the temporary container 36 with a time interval of which period is determined by the droplet formation frequency, the volume of the temporary container 36 and the suction rate of the returning pump 34. When the light beam emitted from the light emitting element 38 is shielded by the ink liquid, the output level of the light responsive element 40 is reduced.

Figure 6:
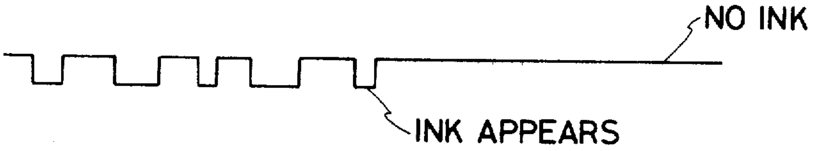
FIGS. 6 and 7 are charts showing signals occurring within the detection system of FIG. 5.

FIG. 6 shows an example of the output level of the light responsive element 40. The output level of the light responsive element 40 becomes low at every time when the ink liquid appears in the temporary ink container 36. The low level output signal of the light responsive element 40 functions to trigger the retriggerable one-shot multivibrator 42, whereby the retriggerable one-shot multivibrator 42 develops an output signal of the logic low.

Figure 7:
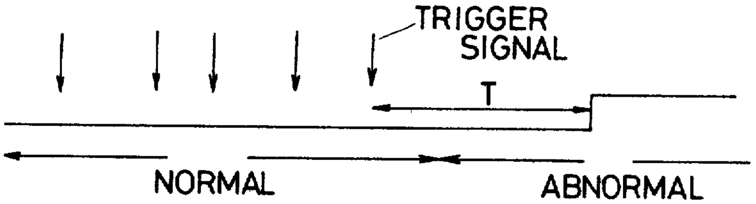

When the ink droplets charged to the zero level (0) are not caught by the beam gutter 30, the output level of the light responsive element 40 is maintained at the high level as shown in the right part of FIG. 6. Thus, the retriggerable one-shot multivibrator 42 is not triggered for a period more than a preselected period T, as shown in FIG. 7. The output signal of the retriggerable one-shot multivibrator 42 bears the logic high as shown in the right part of FIG. 7 to indicate the abnormal direction of the ink liquid emitted from the ink droplet issuance unit 12. In response to the detection output derived from the detection system, the control system functions to terminate the operation of the supply pump 16 for terminating the ink droplet formation.

FIG. 8 shows an operation flow for automatically adjusting the direction of the ink droplets emitted from the ink droplet issuance unit 12.

For automatically adjusting the direction of the emitting ink droplets, the ink droplets of the zero level (0) are emitted from the ink droplet issuance unit 12. First, the maximum bias voltage is applied to the charge control circuit so that the ink droplets of the zero level (0) pass over the beam gutter 30. Then, the bias voltage applied to the charging tunnel 20 is gradually reduced till the detection system of FIG. 5 develops an output signal showing the normal operation condition.

It is preferable for ensuring the rapid response that the temporary ink container 36 is positioned near the beam gutter 30.

The invention being thus described, it will be obvious that the same may be varied in many ways. Such variations are not to be regarded as a departure from the spirit and scope of the invention, and all such modifications are intended to be included within the scope of the following claims.

What is claimed is:

1. In an ink jet system printer including:

an ink liquid reservoir for containing ink liquid therein;

ink droplet issuance means for emitting ink droplets toward a record receiving member;

ink supply means for supplying the ink liquid from said ink liquid reservoir to said ink droplet issuance means;

charging means for charging the ink droplets emitted from said ink droplet issuance means in accordance with print information;

deflection means for deflecting the charged ink droplets;

a beam gutter for catching ink droplets not contributing to the actual printing operation, said beam gutter being positioned in front of said record receiving member; and ink liquid returning means for returning the ink liquid collected by said beam gutter to said ink liquid reservoir, the improvement comprising:

detection means disposed in the course of said ink liquid returning means and responsive to the presence of ink liquid for developing a detection output; and determination means for developing a determination output in the absence of said detection output from said detection means for a preselected period.

2. The ink jet system printer of claim 1, wherein said ink liquid returning means includes a suction pump and conduit means for connecting said beam gutter to said ink liquid reservoir through said suction pump, and wherein said detection means is disposed in said conduit means.

3. The ink jet system printer of claim 2, said detection means comprising:

a transparent conduit disposed in said conduit means of said ink liquid returning means;

a light emitting element confronting said transparent conduit; and a light responsive element confronting said light emitting element through said transparent conduit, said light responsive element developing said detection output.

4. The ink jet system printer of claim 3, said determination means comprising a retriggerable one-shot multivibrator of which an input terminal is connected to receive said detection output derived from said light responsive element, and of which an output terminal develops said determination output.

5. The ink jet system printer of claim 2, wherein said ink supply means includes a supply pump for supplying the ink liquid from said ink liquid reservoir to said ink droplet issuance means, and wherein said suction pump has the ability greater than that of said supply pump.

6. The ink jet system printer of claim 1, 2, 3, 4 or 5, wherein said detection means is positioned near said beam gutter.

7. Means for terminating the supply of ink liquid to an ink jet nozzle in an ink jet system printer in response to an abnormal deflection condition, comprising:

nozzle means for emitting a stream of ink drops;

ink liquid supply means for providing ink liquid to said nozzle means;

means for selectively imparting calibrated deflections to each of the ink drops in said stream including a predetermined deflection to a substantial number of said ink drops;

gutter means catching said substantial number of ink drops under normal calibrated deflection conditions;

ink liquid return means from said gutter means to said ink liquid supply means for returning said ink liquid from the former to the latter; and detection means in said ink liquid return means responsive to the absence of ink liquid for a predetermined time period as an indication of the occurrence of an abnormal deflection condition for constraining said ink liquid supply means to cease providing ink liquid to said nozzle means.

8. The ink liquid supply terminating means of claim 7, wherein said ink liquid return means comprises:

conduit means for interconnecting said gutter means with said ink liquid supply means; and suction pump means in said conduit means for propelling said ink liquid therethrough; and wherein said detection means includes transducer means proximate to said conduit means and responsive to the presence and absence of said ink liquid therein.

9. The ink liquid supply terminating means of claim 8, wherein said transducer means comprises:

transparent means in said conduit means for viewing said ink liquid therethrough;

light emitting means adjacent one side of said transparent means for providing illumination to the latter; and light responsive means adjacent the opposite side of said transparent means for receiving said illumination in the absence of ink liquid in said transparent means and for providing an output signal in response to such absence.

10. The ink liquid supply terminating means of claim 9, wherein said detection means further comprises:

control means responsive to the existence of said output signal for at least said predetermined time period for constraining said ink liquid supply means to cease providing said ink liquid.

11. The ink liquid supply terminating means of claim 10, wherein said control means comprises retriggerable one-shot multivibrator means for providing a control output for said ink liquid supply means, said multivibrator means having input means for receiving said output signal from said transducer means.

12. The ink liquid supply terminating means of claim 8, wherein said ink liquid supply means includes supply pump means; and wherein, said suction pump means is of greater capacity than said supply pump means.

13. The ink liquid supply terminating means of claim 7, 8, 9, 10, 11 or 12, wherein said detection means is responsive to the absence of ink liquid in said ink liquid return means at a point closely adjacent said gutter means.

* * * * *